United States Patent [19]

Ishida et al.

[11] Patent Number: 4,840,104
[45] Date of Patent: Jun. 20, 1989

[54] KEYBOARD

[75] Inventors: Muneo Ishida; Mithuo Yamashita, both of Hamamatsu; Masanari Onishi, Himeji; Masahiro Tanaka, Hyogo, all of Japan

[73] Assignee: Kawai Musical Instrument Manufacturing Co., Ltd., Hamamatsu, Japan

[21] Appl. No.: 152,532

[22] Filed: Feb. 5, 1988

[30] Foreign Application Priority Data

Mar. 3, 1987 [JP] Japan .................. 52-47998

[51] Int. Cl.$^4$ .............................................. G10C 3/12
[52] U.S. Cl. ........................................ 84/437; 84/438; 84/452 P
[58] Field of Search ................. 84/423, 433, 437, 438, 84/452 R, 452 P

[56] References Cited

U.S. PATENT DOCUMENTS

| 251,212 | 12/1881 | French | 84/438 |
|---|---|---|---|
| 274,328 | 3/1883 | Hoggson et al. | 84/438 |
| 3,032,455 | 5/1962 | Fauser | 84/438 X |
| 3,060,074 | 10/1962 | Good | 84/438 X |
| 4,346,639 | 8/1982 | Vagias | 84/437 |

Primary Examiner—Lawrence R. Franklin
Attorney, Agent, or Firm—Flynn, Thiel, Boutell & Tanis

[57] ABSTRACT

A keyboard for a musical instrument is composed of a resin composition, having a durometer hardness of 82 or larger, and the composition comprises a cellulose derivative resin and a silica having 3.0 or less silanol groups in the area of 100 square angstrom and a BET specific surface area of 10 to 210 m$^2$/g. It may comprises a substrate and the keyboard.

7 Claims, 1 Drawing Sheet

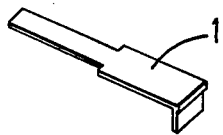
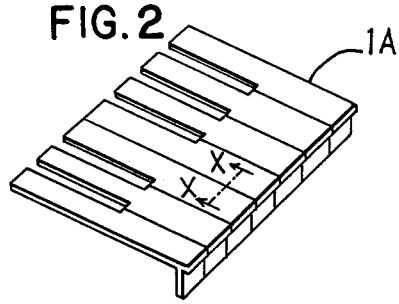
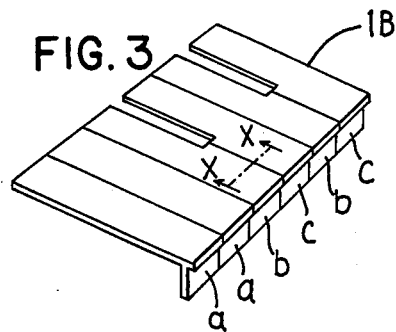
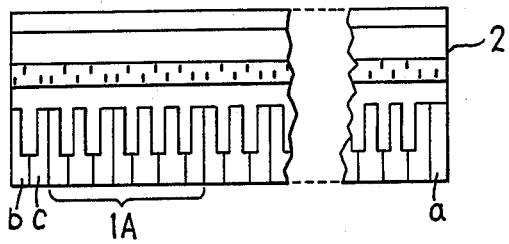
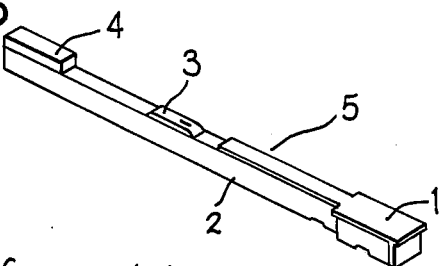
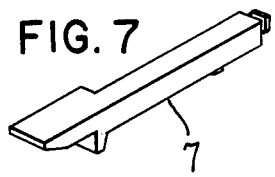

KEYBOARD

The present invention relates to a keyboard made of a cellulose derivative resin containing silica.

[PRIOR ART]

In general, ivory, an acrylic resin, a casein resin or the like is used as a keyboard material of a piano, an accordion, an organ, an electronic musical instrument, and other keyboard instruments.

Ivory is said to be an ideal keyboard material since it has a suitable moisture absorptivity and a suitable surface hardness, gives a very good touch to fingers during playing, and provides easy keyboard control. However, ivory is becoming unavailable because of exhaustion of resources and from the viewpoint of preservation of resources. Even if it is available, it is very expensive and the yield of a keyboard is poor because it is round-shaped.

Therefore, moldings of an acrylic resin are used in general uses. However, the touch to fingers is bad because of substantially no moisture absorptivity and fingers are liable to slip because of sweating, thus making keyboard control difficult. What is worse, dust is liable to adhere to the surface because of static electrification.

On the other hand, the casein resin is poor in productivity because a long period of time is taken to harden the resin with formalin.

The present invention aims at eliminating the above-mentioned defects. An object of the present invention is to provide a keyboard which has merits like those of ivory, such as a suitable moisture absorptivity, a high surface hardness, and a good touch to fingers, and which is excellent in productivity and processability.

(SUMMARY OF THE INVENTION)

The inventors of the present invention have made intensive investigations with a view to attaining the above-mentioned object, and have found that a keyboard material resembling ivory and having an improved surface hardness can be obtained by adding a specific silica as an inorganic filler to a cellulose derivative resin with their attention focused on the fact that the cellulose derivative resin essentially has a moisture absorptivity, a good touch to fingers, a toughness and an excellent processability, and notably absorbs a sound of 3,000 Hz or above.

Specifically, in accordance with the present invention, there is provided a keyboard made of a keyboard material having a durometer hardness of 82 or more and comprising a cellulose derivative resin containing a silica having a number of silanol groups of 3.0 or smaller per 100 square angstrom and a BET specific surface area of 100 to 210 m²/g.

According to the invention, a keyboard is composed of a resin composition, having a durometer hardness of 82 or larger, and the composition comprises a cellulose derivative resin and a silica having 3.0 or less silanol groups in the area of 100 sequare angstrom and a BET specific surface area of 10 to 210 m²/g.

It is preferable that the composition comprises 100 parts by weight of the cellulose derivative resin and 15 or more parts by weight of the silica. It may further contain 20 to 50 parts by weight of a plasticizer. The cellulose derivative resin is preferably selected from the group consisting of cellulose acetate resin, cellulose acetate propionate resin and cellulose acetate butyrate resin.

The invention also provides a keyboard comprising a keyboard substrate and a covering part thereon composed of the resin composition as defined above and then a keyed instrument having keyboards as defined above.

Examples of the cellulose derivative resin to be used in the present invention include cellulose acetate, cellulose acetate propionate, and cellulose acetate butyrate resins, among which cellulose acetate resin is preferred.

A plasticizer is added to a cellulose acetate resin that may be used in the present invention. Representative examples of the plasticizer include phthalates such as dimethyl phthalate, diethyl phthalate, and dibutyl phthalate. The amount of the plasticizer is most suitably 20 to 50 parts by weight per 100 parts by weight of cellulose acetate flakes as the raw material in the case of an injection molding material. When the amount of the plasticizer added is less than 20 parts by weight, the flowability is notably lowered, leading to a difficulty in injection molding, and the molding temperature is inevitably so increased that deterioration and discoloration of the resin are liable to occur. When it exceeds 50 parts by weight, the flowability is improved but the resin itself is softened and hence the amount of silica must be increased to improve the hardness, leading to a decrease in impact strength. Thus, an unsuitable keyboard material is provided.

The silica that can be used in the present invention may be any of various ones prepared by a wet process or a dry process. A silica having a number of silanol groups of 3.0 or less per 100 square angstrom and a BET specific surface area of 100 to 210 m²/g must be used. The number of silanol groups can be calculated from the specific surface area measured by water vapor adsorption by the following equation:

$$\text{number of silanol groups (per 100Å}^2\text{)} = \frac{\text{specific surface area (m}^2\text{/g) by water vapor adsorption} \times 100}{10.6[\text{sectional area of water molecule (Å}^2)] \times BET \text{ specific surface area (m}^2\text{/g)}}$$

(provided that one water molecule is adsorbed on one silanol group).

When the number of silanol groups exceeds 3.0, the content of water adsorbed on the silica surfaces is so high that a cellulose derivative filled with the silica may foam in the steps of melting by heating and kneading, and hydrolysis of the cellulose derivative resin is promoted, thus presenting many problems.

The BET specific surface area is determined from the amount of adsorbed nitrogen gas according to the BET method as stipulated in ASTM D-3037. The value of the BET specific surface area serves as a measure of the fundamental particle size of silica. When it is less than 100 m²/g, the particle size is so large that neither smooth surface nor sufficient hardness is obtained when the silica is blended with the resin and the blend is molded. When it exceeds 210 m²/g, the cohesion between silica particles themselves is so high that the dispersibility of silica in the cellulose derivative resin is notably deteriorated.

The durometer hardness in the present invention is D hardness as stipulated in JIS K 7215.

In order to obtain a surface hardness of 82 or more in terms of durometer hardness, 15 parts by weight or more of the above-specified silica must be blended with 100 parts by weight of the cellulose derivative resin. When the surface hardness is less than 82 in terms of durometer hardness, the resulting key is liable to be scratched by nails or the like. Thus, such a hardness is unsuitable.

The reasons why the silica is chosen as the inorganic filler in the present invention will now be described. A required surface hardness is obtained by a smaller amount of the silica than those of other inorganic fillers. Thus, the reduction in flowability of the blend is so small that the injection moldability is good. The silanol groups remain on the surface of the silica. Thus, the silica has a moisture absorptivity. Therefore, when the silica is blended with the cellulose derivative resin, it does not spoil the moisture absorptivity of the cellulose derivative resin and gives a synergistic effect.

The silica-containing cellulose derivative resin may be appropriately admixed with usual amounts of usual thermal stabilizers for preventing thermal deterioration, such as a weak organic acid, an epoxy compound, a phosphite, a thioether phosphite, a phenol derivative, a thiophosphite, imidazole, an amine derivative or a metallic soap, or a dyestuff or a pigment.

The keyboard of the present invention is produced by bonding a key cover obtained by injection molding of the silica-containing cellulose derivative resin to a wooden keyboard base made of spruce or basswood or a keyboard base made of other synthetic resin foamed or not foamed. Alternatively, a plurality of injection molding machines are used for one-piece multi-molding of a combination of a silica-containing cellulose derivative resin and other resin wherein the former constitutes the surface. Further alternatively, an injection molding machine is used for one-piece molding of a whole key of a keyboard. The molding of the silica-containing cellulose derivative resin is efficiently effected by injection molding, but may be done by other known methods.

As described above, the keyboard of the present invention is made of the keyboard material comprising a cellulose derivative resin containing a specific silica. According to the present invention, the keyboard material can be efficiently and easily molded by using an injection molding machine like conventional acrylic resin. The material according to the present invention has a moisture absorptivity by far higher than that of the acrylic resin and is close to that of ivory. The surface hardness of the keyboard of the present invention is comparable to that of ivory, and hence the keyboard has a good touch to fingers in playing. The keyboard of the present invention can be produced with a high productivity.

The keyboard of the present invention is hardly electrified because it has a moisture absorptivity, and hence dust hardly adheres to the surface thereof. Further it can absorb a sound of 3,000 Hz or higher to a greater extent than those of other thermoplastic resins, and hence it prevents noises because it absorbs the sound of contact of the keyboard with fingers.

(BRIEF EXPLANATION OF THE ATTACHED DRAWINGS)

FIG. 1 is a perspective view of a white key cover obtained by injection molding of a silicacontaining cellulose acetate resin according to the present invention;

FIG. 2 is a perspective view of a white key cover having an octave width;

FIG. 3 is a perspective view of a parent white key cover;

FIG. 4 is a plan view of a state of a white key cover being bounded to a keyboard base;

FIG. 5 is a completed white key for a piano;

FIG. 6 is a crosssectional view along the line X—X in FIG. 2 or 3; and

FIG. 7 is a perspective view of a white key for an electronic organ.

1 ... white key cover
1A ... white key cover with octave width
1B ... parent white key cover
2 ... keyboard base
5 ... white key for piano
7 ... white key for electronic organ (EMBODIMENTS OF THE INVENTION)

The following Examples will further illustrate the present invention, but should not be construed as limiting the scope of the invention.

In general, the keyboard of a keyed instrument consists of both white and black keys. In the following Examples, description will be made with reference to a white key as an example.

EXAMPLE 1

100 parts by weight of cellulose acetate flakes was admixed with 27 parts by weight of a phthalate plasticizer, 0.2 part by weight of an epoxy compound and 0.3 part by weight of an alkyl phosphite as thermal stabilizers, 30 parts by weight of a silica having a number of silanol groups of 2.1 per 100 square angstrom, a BET specific surface area of 136 $m^2/g$ and an average particle size of 0.9 $\mu$m, and 2.5 parts by weight of a white pigment in a universal mixing agitator at 80° C. for 4 hours while drying the mixture so as to provide a water content of 0.2 wt. % or lower. The mixture was meltkneaded and extruded with an extruder of 40 mm in diameter of 220° C. to form pellets.

FIG. 1 shows a white key cover 1 for a piano which is molded from these pellets with an injection molding machine. More precisely, two kinds of key, i.e., a white key cover 1A having an octave width (one-piece molding of 7 key covers for 1 octave) as shown in FIG. 2 and a parent white key covers 1B (one-piece molding for 2 instruments) as shown in FIG. 3, are molded. As shown in FIG. 4, the key covers are bonded to the front of a keyboard base 2 formed by lateral bonding of basswood, spruce, or the like, followed by sawing with a sawing machine. Thus, a white key 5 as shown in FIG. 5 is completed. Sawing is done along a sawing groove 6 as shown in FIG. 6 with a band saw or the like. FIG. 6 is a crosssectional view along the line X—X in FIGS. 2 or 3. In FIG. 5, the numeral 3 refers to a middle plate and the numeral 4 refers to a tip plate.

Test pieces were formed by injection molding of the pellets, and various properties were examined. For comparison, properties of an acrylic resin and ivory were examined. The results are shown in Table 1.

TABLE 1

| Item | Ex. 1 | Comp. Ex. polymethyl methacrylate resin | Ref. Ex. ivory |
|---|---|---|---|
| specific gravity | 1.41 | 1.17 | 1.72 |

TABLE 1-continued

| Item | Ex. 1 | Comp. Ex. polymethyl methacrylate resin | Ref. Ex. ivory |
| --- | --- | --- | --- |
| water absorption (%) (JIS K 6791) | 3 | 0.4 | 14 |
| Surface hardness (durometer hardness) | 86 | 83 | 85~86 |
| coefficient of static friction* | 0.64 | 0.62 | 0.66 |

(Note)
*the coefficient of static friction was measured against buckskin.
Conditions: cross head speed 50 mm/min weight 200 g.

As can be understood from the properties shown in Table 1, the keyboard obtained in this Example is massive because of a large specific gravity and has a high coefficient of static friction as compared with the acrylic resin keyboard. Further, it has a water absorptivity higher by one figure than that of the acrylic resin so that it has a good touch to fingers and hardly causes slippage even when a player sweats. Thus, the keyboard control is easy.

EXAMPLE 2

A white key 7 for an electronic organ as shown in FIG. 7 was formed by one-piece molding of the same silica-containing cellulose acetate resin pellets as those obtained in Example 1 with an injection molding machine. A keyboard made up of these white keys is excellent in controllability.

What is claimed is:

1. A keyboard composed of a resin composition, having a durometer hardness of 82 or larger, which comprises a cellulose derivative resin and a silica having 3.0 or less silanol groups in the area of 100 square angstrom and a BET specific surface area of 10 to 210 m$^2$/g.

2. A keyboard as claimed in claim 1, in which said composition comprises 100 parts by weight of the cellulose derivative rein and 15 or more parts by weight of the silica.

3. A keyboard as claimed in claim 2, in which the composition further contains 20 to 50 parts by weight of a plasticizer.

4. A keyboard as claimed in claim 1, in which said cellulose derivative resin is selected from the group consisting of cellulose acetate resin, cellulose acetate propionate resin and cellulose acetate butyrate resin.

5. A keyboard comprising a keyboard substrate and a covering part thereon composed of the resin composition ad defined in claim 1.

6. A keyed instrument having keyboards as defined in claim 5.

7. A keyed instrument having keyboards as defined in claim 1.

* * * * *